US006311993B1

(12) United States Patent
Hulstein et al.

(10) Patent No.: US 6,311,993 B1
(45) Date of Patent: Nov. 6, 2001

(54) LIFT AXLE SUSPENSION MOUNTING SYSTEM

(75) Inventors: Gregory W. Hulstein, Sioux Center; Philip L. Kats, Hull, both of IA (US)

(73) Assignee: Link Mfg., Ltd., Sioux Center, IA (US)

( * ) Notice: Subject to any disclaimer, the term of this patent is extended or adjusted under 35 U.S.C. 154(b) by 0 days.

(21) Appl. No.: 09/691,510

(22) Filed: Oct. 18, 2000

(51) Int. Cl.[7] .................................................. B62D 61/12
(52) U.S. Cl. ........................................ 280/86.5; 280/86.75
(58) Field of Search ............................. 280/86.5, 86.75, 280/124.128, 124.153

(56) References Cited

U.S. PATENT DOCUMENTS

| Re. 30,308 | * | 6/1980 | Masser . | |
|---|---|---|---|---|
| 2,564,509 | | 8/1951 | Shelton | 180/73 |
| 3,112,100 | | 11/1963 | Prichard | 259/161 |
| 3,191,961 | | 6/1965 | Brennan et al. | 280/81 |
| 3,191,963 | | 6/1965 | Prichard | 280/81 |
| 3,246,884 | | 4/1966 | Prichard et al. | 259/161 |
| 3,317,193 | | 5/1967 | Buelow et al. | 259/161 |
| 3,479,049 | | 11/1969 | Duecy | 280/81 |
| 3,504,930 | | 4/1970 | Kozowyk et al. | 280/124 |
| 3,511,493 | | 5/1970 | Burrell | 263/47 |
| 3,567,189 | | 3/1971 | Buelow | 259/176 |
| 3,633,879 | | 1/1972 | Prichard | 259/172 |
| 3,704,896 | | 12/1972 | Buelow | 280/81 A |
| 3,838,885 | | 10/1974 | Brennan et al. | 298/22 R |
| 3,885,808 | | 5/1975 | Derrwaldt | 280/81 R |
| 3,895,818 | | 7/1975 | Fearon | 280/81 R |
| 3,912,293 | | 10/1975 | Harbers | 280/81 R |
| 3,960,388 | * | 6/1976 | Strader et al. . | |
| 3,985,036 | | 10/1976 | Decker et al. | 74/96 |
| 4,032,116 | | 6/1977 | Prichard | 259/69 |
| 4,063,779 | | 12/1977 | Martin et al. | 298/22 P |
| 4,082,305 | | 4/1978 | Allison et al. | 280/81 R |
| 4,084,833 | | 4/1978 | Mohrbacker et al. | 280/81 A |
| 4,350,358 | | 9/1982 | Ferris | 280/81 R |
| 4,513,990 | | 4/1985 | Morita et al. | 280/725 |
| 4,588,201 | | 5/1986 | Mohrbacker | 280/405 R |
| 4,705,133 | * | 11/1987 | Christenson et al. . | |
| 4,708,361 | | 11/1987 | Takada et al. | 280/663 |
| 4,762,421 | | 8/1988 | Christenson et al. | 366/54 |
| 4,848,783 | * | 7/1989 | Christenson et al. . | |
| 4,940,287 | | 7/1990 | Ritchie | 298/23 R |
| 5,046,756 | * | 9/1991 | Hertrick . | |
| 5,498,021 | * | 3/1996 | Christenson . | |
| 5,833,026 | | 11/1998 | Zetterström et al. | 180/360 |
| 5,899,470 | * | 5/1999 | Heitzmann . | |
| 6,007,078 | * | 12/1999 | Gottschalk et al. . | |
| 6,019,435 | | 2/2000 | Bach | 301/105.1 |
| 6,135,469 | | 10/2000 | Hulstein et al. | 280/86.5 |
| 6,247,713 | * | 6/2001 | Konop . | |

* cited by examiner

*Primary Examiner*—Paul N. Dickson
(74) *Attorney, Agent, or Firm*—Zarley, McKee, Thomte, Voorhees & Sease; Dennis L. Thomte

(57) ABSTRACT

A lift axle is pivotally mounted to the frame of a vehicle for selectively providing additional flotation for the vehicle. A pair of frame brackets are secured to the frame members of the vehicle and have horizontally disposed mounting plate portions adjacent the lower ends thereof which have transversely extending bolt slots formed therein. First and second trailing arm mounting brackets are positioned below the first and second frame brackets, respectively, and have bolt openings provided in an upper mounting plate portion thereon to enable bolts to adjustably secure the trailing arm mounting brackets to the frame brackets. The lift axle suspension system is operatively connected to the mounting brackets. The connection of the first and second mounting brackets with respect to the first and second frame brackets permits the lift axle assembly to be mounted on frame members having varying distances therebetween and having varying frame thicknesses.

5 Claims, 4 Drawing Sheets

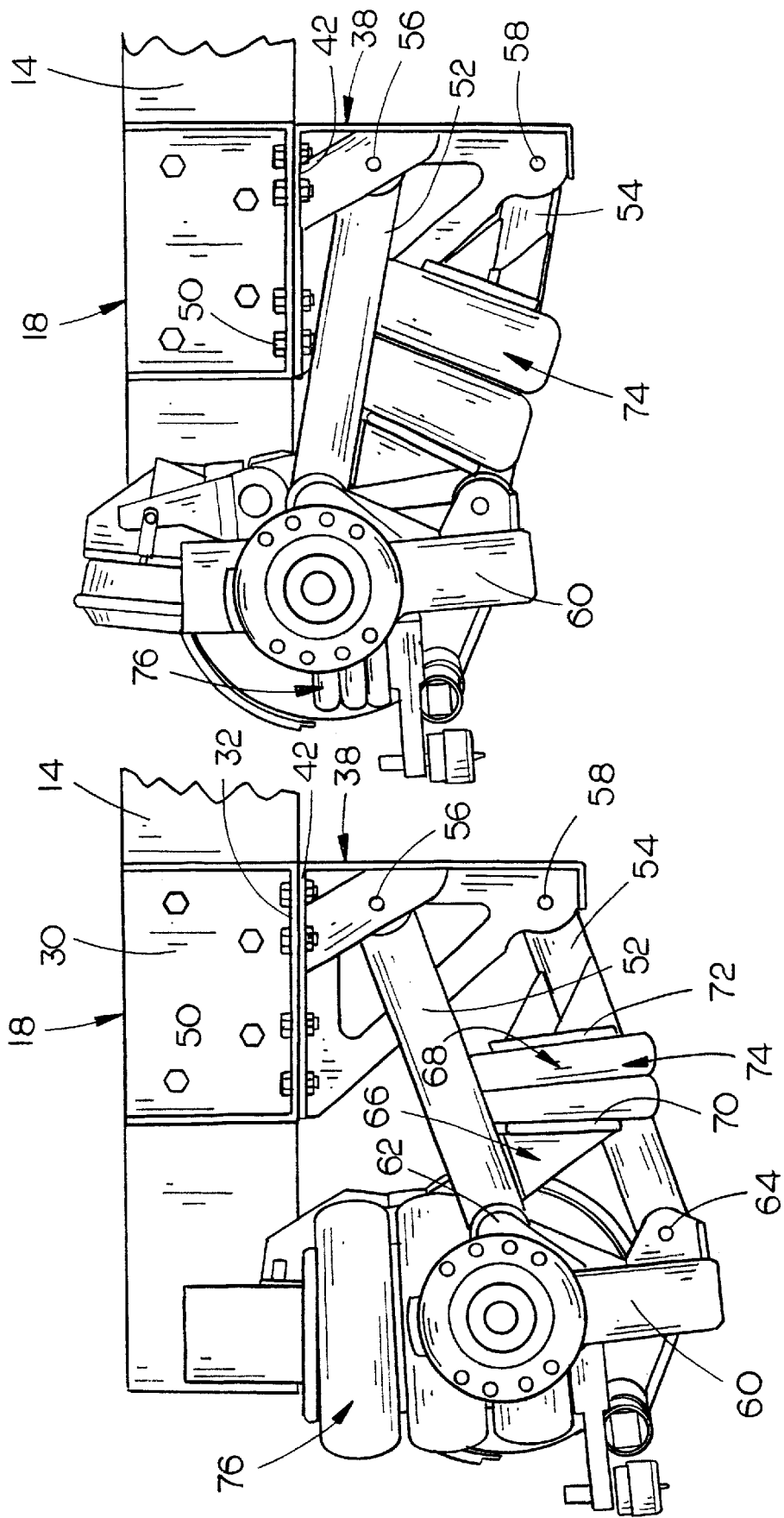

US 6,311,993 B1

LIFT AXLE SUSPENSION MOUNTING SYSTEM

BACKGROUND OF THE INVENTION

1. Field of the Invention

This invention relates to a lift axle suspension mounting system and more particularly to a lift axle suspension mounting system wherein the lift axle suspension assembly is secured to the frame of a truck between the tandem axles and the cab of the truck. The lift axle may also be mounted on the rearward end of the frame rearwardly of the tandem axles. The lift axle assembly of this invention is pivotally movable with respect to the vehicle between a first position in which the wheels of the lift axle are elevated and a second position in which the wheels engage the ground. The lift axle of this invention further relates to a lift axle assembly which is designed so that a variable load may be placed upon the wheels when the wheels are in the ground engaging position. More particularly, the lift axle suspension of this invention is designed to fit truck frames having varying dimensions.

2. Description of the Related Art

Lift axle assemblies have been used for many years on work vehicles such as transit concrete mixers, gravel trucks, etc. The lift axle assemblies of the prior art permit the vehicle to carry more weight while still meeting the regulations governing the weight which the vehicles can legally carry over federal and state highways. Most of the prior art lift axle assemblies are pivotally movable with respect to the frame of the vehicle so that the wheels of the lift axle assembly may be pivotally moved from a ground engaging position to an elevated position.

Although the lift axle assemblies of the prior art have apparently met with considerable success, the prior art lift axle assemblies suffer from many shortcomings. First, the prior art lift axle assemblies are not believed to be readily adaptable to vehicle frame width variations. Additionally, the prior art lift axle assemblies are not believed to be able to adapt to vehicle frame thickness variations. Further, the maintenance and service of the prior art lift axle assemblies appears to be rather complex, in most cases. Additionally, the prior art lift axles are not believed to be able to be conveniently and easily mounted on the frames of the vehicles nor is it believed that the prior art lift assemblies are able to control lateral movement of the lift axle in a satisfactory manner.

It is therefore a principal object of the invention to provide an improved mounting system for a lift axle assembly for a vehicle such as a truck or the like.

Still another object of the invention is to provide a lift axle assembly which accommodates frame width variations and frame thickness variations.

Yet another object of the invention is to provide a lift axle suspension mounting system which is extremely safe to use.

Yet another object of the invention is to provide a lift axle suspension mounting system which is quickly and easily bolted onto the frame members of the vehicle.

These and other objects will be apparent to those skilled in the art.

SUMMARY OF THE INVENTION

A lift axle suspension mounting system is described wherein the lift axle is pivotally mounted to the frame of a vehicle such as a dump truck or transit concrete mixer for selectively providing additional flotation for the vehicle with the vehicle including first and second, spaced-apart, longitudinally extending frame members having rearward and forward ends, and inner and outer sides. First and second frame brackets are bolted to the first and second frame members, respectively. If a pusher lift suspension is being used, the frame brackets are secured to the truck frame between the truck cab and the tandem axles. If a tag axle is being used, the frame brackets are secured to the rearward ends of the frame members. First and second trailing arm mounting brackets are bolted to the first and second frame brackets in a manner whereby frame width variances and frame member thickness can be accommodated. First and second suspension or trailing arms, having rearward and forward ends, are pivotally secured at their forward ends to the first and second trailing arm mounting brackets, respectively, and extend rearwardly therefrom. An axle assembly is mounted on the rearward ends of the first and second trailing arms and has wheels mounted thereon. A power actuated means is provided and is operatively connected to the first and second trailing arms for moving the wheels into a ground engaging position and for moving the wheels out of ground engagement.

BRIEF DESCRIPTION OF THE DRAWINGS

FIG. 3 is a side view as seen from the right of the lift axle with the lift axle mounted on a truck or the like;

FIG. 4 is a view similar to FIG. 3 except that the lift axle has been raised to its elevated position;

DESCRIPTION OF THE PREFERRED EMBODIMENT

Figure 1:
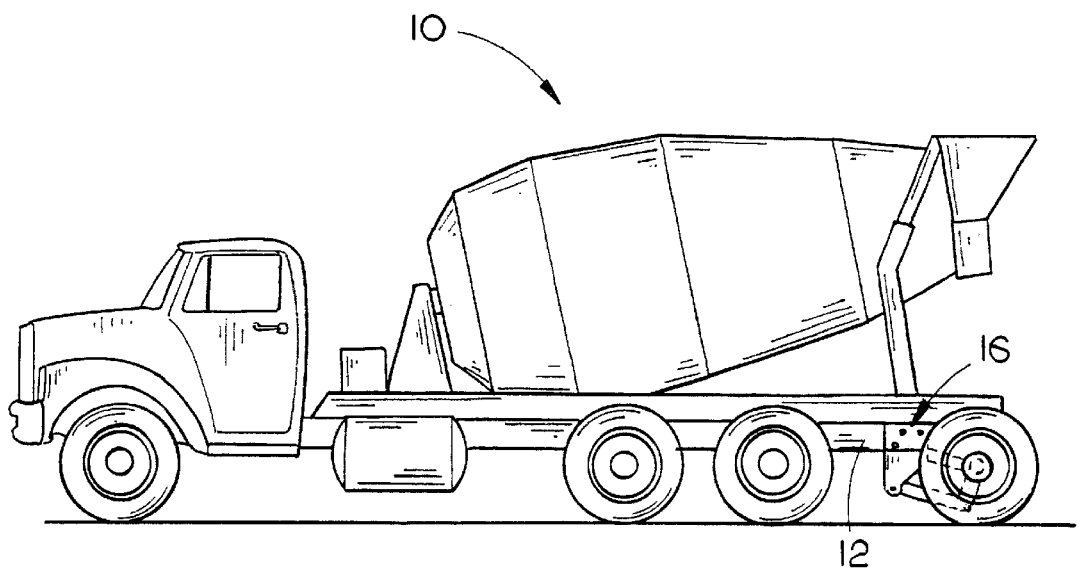
FIG. 1 is a side view of a transit concrete mixer having the lift axle of this invention mounted thereon in a tag axle manner.
Figure 2:
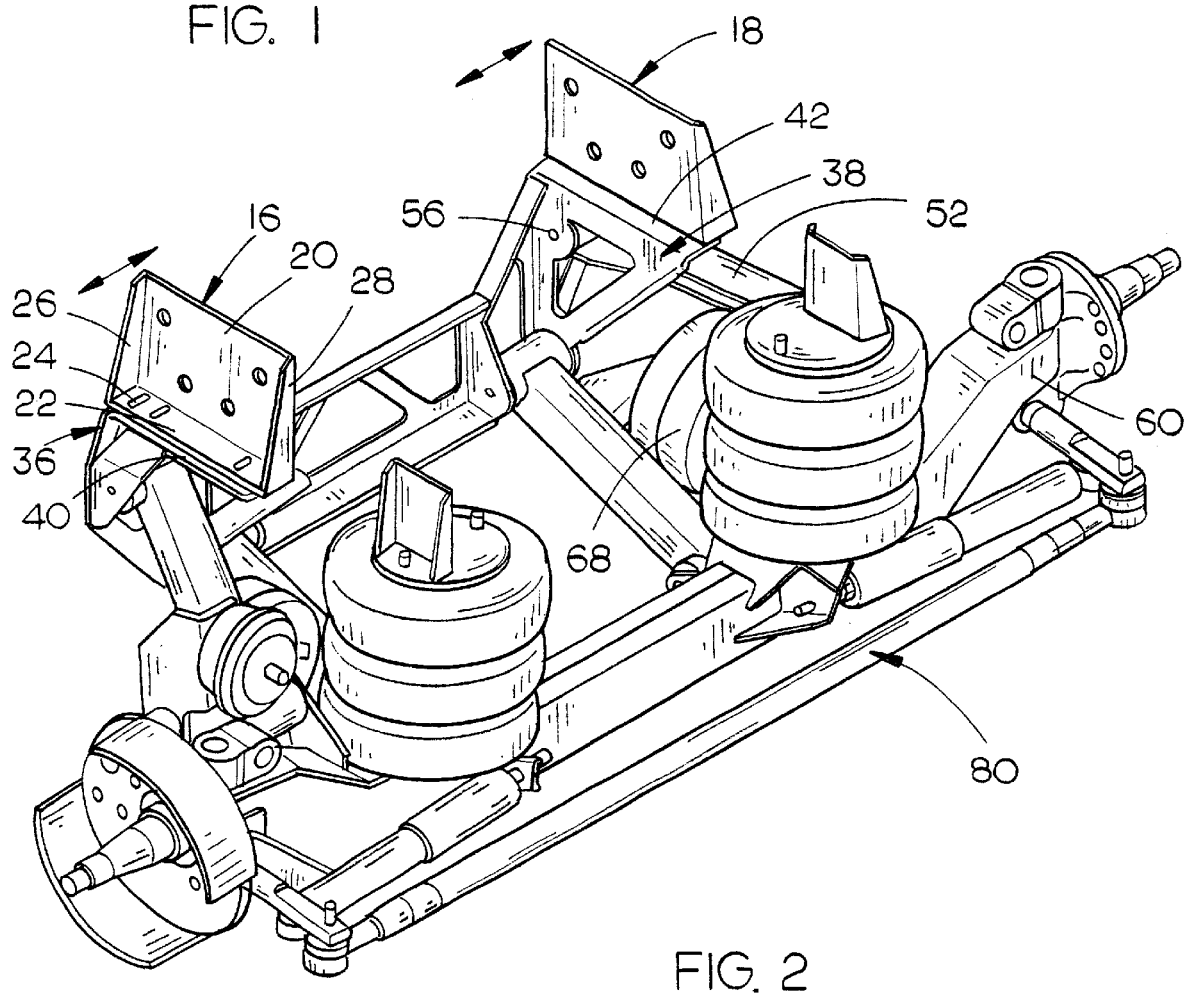
FIG. 2 is a rear perspective view of the lift axle mounting system of this invention.
Figure 5:
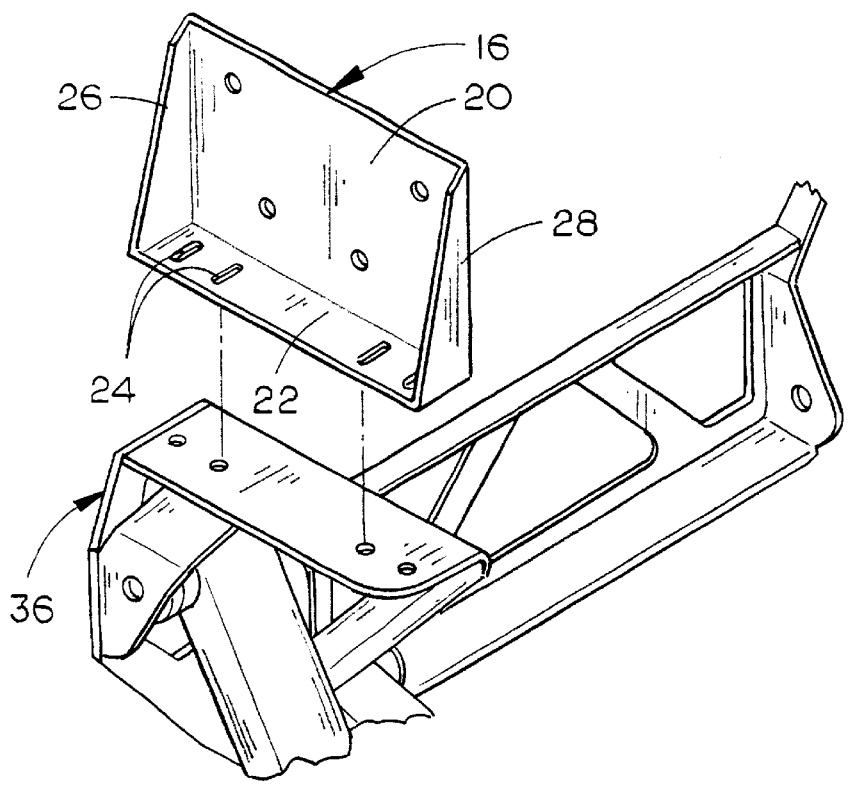
FIG. 5 is a partial perspective view illustrating the mounting system of this invention.
Figure 6:
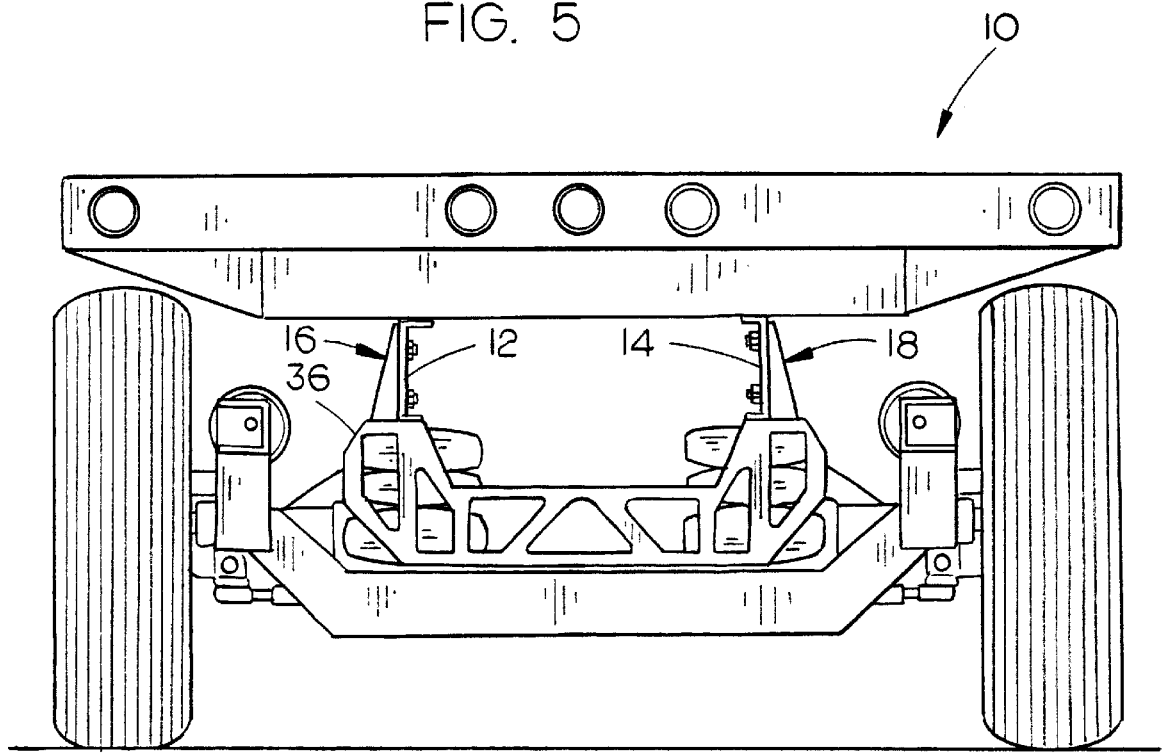
FIG. 6 is a partial rear view illustrating the mounting system of this invention.
Figure 7:
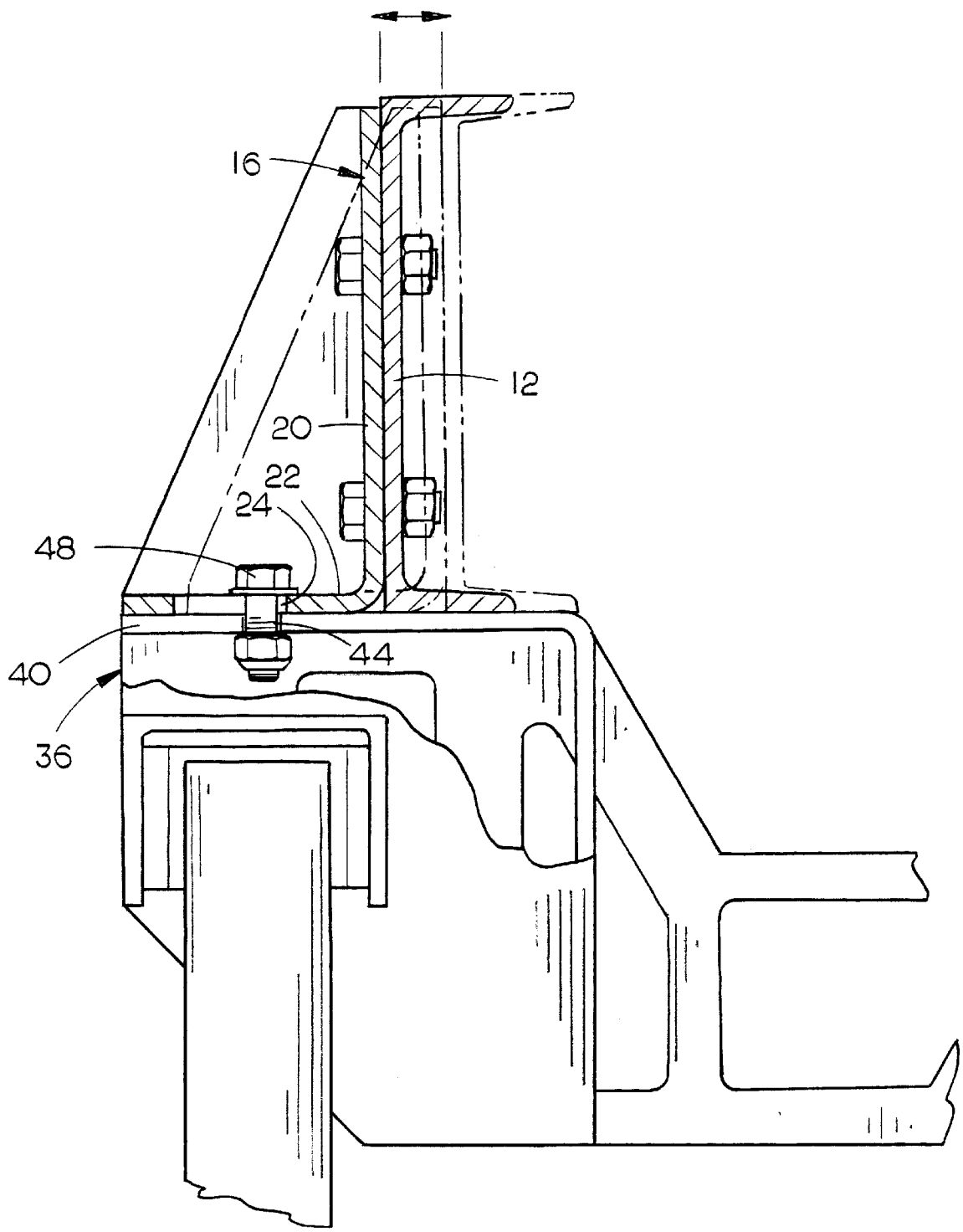
FIG. 7 is a partial sectional view illustrating the mounting system of this invention.

The numeral 10 refers to a vehicle such as a transit concrete mixer. It should be understood that the lift axle suspension of this invention may be mounted on any vehicle requiring additional flotation in order for the vehicle to comply with state and federal highway regulations. FIG. 1 illustrates the lift axle being employed as a tag axle. However, the lift axle could be mounted between the cab and the tandem axles. Vehicle 10 includes spaced-apart, longitudinally extending frame members 12 and 14. If the lift axle is used as a tag axle, frame brackets 16 and 18 are bolted to the rearward ends of the frame members 12 and 14, as seen in the drawings. Frame bracket 16 includes a vertically disposed plate portion 20 and a horizontally disposed mounting plate portion 22 at the lower end thereof which has a plurality of spaced-apart slots 24 formed therein with the length of the slots 24 being disposed transversely with respect to the length of the frame member 12. Gusset plates 26 and 28 are provided for strengthening purposes. Similarly, frame bracket 18 includes a vertically disposed portion 30 having a horizontally disposed mounting plate portion 32 at the lower end thereof which has a plurality of slots formed therein identical to slots 24 with the length of the slots being disposed transversely with respect to the length of the frame member 14.

The numerals 36 and 38 refer to trailing arm mounting brackets which have horizontally disposed mounting plate portions 40 and 42 at their upper ends thereof, respectively, and which have a plurality of bolt openings formed therein which are adapted to register with the slots 24 and 34, respectively. The bolt openings in plate portion 40 are referred to by the reference numeral 44. The corresponding bolt openings in plate portion 42 are not shown. Bolts 48 extend through registering slots 24 and openings 44 while bolts 50 extend through registering slots 34 and bolt openings, respectively. By using slots in the plate portions 22, 32 and bolt openings in the plate portions 40, 42, the lift axle suspension assembly of this invention may be mounted on vehicles wherein the distance between the frame members 12 and 14 varies somewhat and wherein the wall thicknesses of the frame members 12 and 14 may vary somewhat. Although one particular type of lift axle assembly is disclosed in the drawings, it should be noted that any type of lift axle assembly could be secured to the trailing arm mounting brackets 36 and 38 and the design of the trailing arm mounting brackets 36 and 38 may vary depending upon the particular type of lift axle system being utilized as long as the trailing arm mounting brackets 36 and 38 have mounting plate portions 40 and 42 at their upper ends, respectively, which are designed to cooperate with the mounting plate portions 22 and 32 of the frame brackets 16 and 18, respectively. Although the slots are shown as being provided in the frame brackets, the slots could be provided in the mounting plate portions of the trailing arm mounting brackets 36 and 38 if desired. The frame brackets 16 and 18 are bolted to the frame members 12 and 14, as illustrated in the drawings. Although it is preferred that the brackets 16 and 18 be bolted to frame members 12 and 14, they could be secured thereto by welding or the like if so desired.

A pair of parallel arms 52 and 54 are pivotally secured at their forward ends to the mounting bracket 38 at 56 and 58, respectively. The rearward ends of arms 52 and 54 are operatively pivotally secured to the axle 60 at 62 and 64, respectively. Brackets 66 and 68 are secured to parallel arms 52 and 54, respectively, and have face portions 70 and 72 which are slightly offset with respect to one another at approximately a 7–9° manner. An expandable and retractable air lift spring 74 is secured to and is positioned between the brackets 70 and 72 for raising and lowering the axle 60 and the wheels secured to the opposite ends thereof. The numeral 76 refers to an air spring having its lower end operatively secured to the axle 60 and having its upper end in engagement with the frame member 14 in conventional fashion. The lift axle assembly shown in the drawings is also provided with a stabilizer strut 80 of conventional design. The lift axle assembly is provided with identical structure at the other end of the axle 60 and will not be described in detail for purposes of conciseness. In some cases, the wheels of the lift axle assembly may not be of the steerable type. Further, in some cases, the air springs may be replaced by hydraulic cylinders which are employed to raise and lower the wheels. Although the bolt slots 24 are shown as being formed in the frame brackets and the bolt openings are shown as being framed in the trailing arm mounting brackets, the slots could be formed in the frame brackets and the bolt openings could be formed in the trailing arm mounting brackets.

It can therefore be seen that a novel mounting means has been provided for securing a lift axle suspension to the frame members of a vehicle, even where the distance between the frame members may vary somewhat from one truck to another and wherein the thickness of the frame members may vary somewhat from truck to truck. It can also be seen that the lift axle assembly, or any other lift axle assembly for that matter, can be quickly and easily secured to the frame members of the vehicle in a rapid and convenient manner and may be easily repaired.

Thus it can be seen that the invention accomplishes at least all of its stated objectives.

We claim:

1. In combination:
    a load-bearing vehicle including first and second horizontally spaced-apart, longitudinally extending frame members having rearward and forward ends, and inner and outer sides;
    a lift axle mounted on said vehicle for selectively providing additional floatation thereto comprising:
        first and second frame brackets, having upper and lower ends, and rearward and forward ends, secured to said first and second frame members, respectively;
        each of said first and second frame brackets including a substantially horizontally disposed mounting plate portion adjacent the lower end thereof;
        each of said mounting plate portions having a plurality of elongated bolt slots formed therein between the rearward and forward ends thereof, the length thereof being disposed transversely with respect to the length of the associated frame member;
        first and second trailing arm mounting brackets, having upper and lower ends, and rearward and forward ends, positioned below said first and second frame brackets, respectively;
        each of said first and second trailing arm mounting brackets having a horizontally disposed mounting plate portion at the upper end thereof;
        each of said horizontally disposed mounting plate portions of said first and second trailing arm mounting brackets having a plurality of bolt openings between the rearward and forward ends thereof which register with at least some of the bolt slots of said first and second mounting plate portions of said first and second frame brackets;
        bolts extending through registering bolt openings and bolt slots;
        first and second trailing arms, having rearward and forward ends, pivotally secured at their forward ends to said first and second trailing arm mounting brackets, respectively, and extending rearwardly therefrom;
        an axle assembly mounted on the rearward ends of said first and second trailing arms;
        wheels mounted on said axle assembly;
        and power actuated means operatively connected to said first and second trailing arms for raising and lowering said wheels relative to said frame members.
2. The left axle of claim 1 wherein said frame brackets are bolted to said frame members.
3. In combination:
    a load-bearing vehicle including first and second horizontally spaced-apart, longitudinally extending frame members having rearward and forward ends, and inner and outer sides;
    a lift axle mounted on said vehicle for selectively providing additional floatation thereto comprising:
        first and second frame brackets, having upper and lower ends, and rearward and forward ends, secured to said first and second frame members, respectively;
        first and second trailing arm mounting brackets, having upper and lower ends, and rearward and forward ends, positioned below said first and second frame brackets, respectively;

said first and second frame brackets being laterally adjustably secured to said first and second trailing arm mounting brackets, respectively;

first and second trailing arms, having rearward and forward ends, pivotally secured at their forward ends to said first and second trailing arm mounting brackets, respectively, and extending rearwardly therefrom;

an axle assembly mounted on the rearward ends of said first and second trailing arms;

wheels mounted on said axle assembly;

and power actuated means operatively connected to said first and second trailing arms for raising and lowering said wheels relative to said frame members.

4. The lift axle of claim 3 wherein said frame brackets are bolted to said frame members.

5. The lift axle of claim 3 wherein said trailing arm mounting brackets are bolted to said frame brackets.

\* \* \* \* \*